United States Patent
Balan et al.

(10) Patent No.: US 8,488,888 B2
(45) Date of Patent: Jul. 16, 2013

(54) CLASSIFICATION OF POSTURE STATES

(75) Inventors: Alexandru Balan, Redmond, WA (US);
Matheen Siddiqui, Seattle, WA (US);
Ryan M. Geiss, San Jose, CA (US);
Alex Aben-Athar Kipman, Redmond, WA (US); Oliver Michael Christian Williams, San Francisco, CA (US);
Jamie Shotton, Cambridge (GB)

(73) Assignee: Microsoft Corporation, Redmond, WA (US)

(*) Notice: Subject to any disclaimer, the term of this patent is extended or adjusted under 35 U.S.C. 154(b) by 181 days.

(21) Appl. No.: 12/979,897

(22) Filed: Dec. 28, 2010

(65) Prior Publication Data
US 2012/0163723 A1 Jun. 28, 2012

(51) Int. Cl.
*G06K 9/00* (2006.01)
*G06K 9/46* (2006.01)
*H04N 9/47* (2006.01)

(52) U.S. Cl.
USPC ............ 382/224; 382/100; 382/203; 348/77

(58) Field of Classification Search
USPC ............... 382/100, 103, 164, 171, 224, 254, 382/258, 259, 297, 312, 173, 181, 276, 107, 382/190–208; 235/419–427; 356/12, 21, 356/22; 348/77, 169; 345/419, 418, 427; 463/36–39
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Athitsos, et al., "An Appearance-Based Framework for 3D Hand Shape Classification and Camera Viewpoint Estimation", Retrieved at << http://luthuli.cs.uiuc.edu/~daf/courses/AppCV/Papers/01004129.pdf >>, In Proceedings of the Fifth IEEE International Conference on Automatic Face and Gesture Recognition, 2002, pp. 6.

(Continued)

*Primary Examiner* — Sheela Chawan
(74) *Attorney, Agent, or Firm* — Alleman Hall McCoy Russell & Tuttle LLP (57) ABSTRACT

Systems and methods for estimating a posture of a body part of a user are disclosed. In one disclosed embodiment, an image is received from a sensor, where the image includes at least a portion of an image of the user including the body part. The skeleton information of the user is estimated from the image, a region of the image corresponding to the body part is identified at least partially based on the skeleton information, and a shape descriptor is extracted for the region and the shape descriptor is classified based on training data to estimate the posture of the body part.

20 Claims, 4 Drawing Sheets

U.S. PATENT DOCUMENTS

| | | |
|---|---|---|
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,774,591 A | 6/1998 | Black et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,721,444 B1 | 4/2004 | Gu et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 * | 9/2004 | Grzeszczuk et al. .......... 382/154 |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,007,035 B2 | 2/2006 | Kamath et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,257,237 B1 | 8/2007 | Luck et al. |
| 7,259,747 B2 | 8/2007 | Bell |
| 7,289,645 B2 | 10/2007 | Yamamoto et al. |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,574,411 B2 | 8/2009 | Suontausta et al. |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |

| | | | |
|---|---|---|---|
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 7,974,443 | B2 * | 7/2011 | Kipman et al. ............... 382/103 |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2002/0041327 | A1 | 4/2002 | Hildreth et al. |
| 2003/0085887 | A1 | 5/2003 | Hunt et al. |
| 2008/0019589 | A1 | 1/2008 | Yoon et al. |
| 2008/0026838 | A1 | 1/2008 | Dunstan et al. |
| 2008/0201340 | A1 | 8/2008 | Thonangi |
| 2009/0110292 | A1 | 4/2009 | Fujimura et al. |
| 2010/0094800 | A1 | 4/2010 | Sharp |
| 2010/0197392 | A1 | 8/2010 | Geiss |
| 2010/0214322 | A1 * | 8/2010 | Lim et al. ...................... 345/661 |
| 2010/0215257 | A1 | 8/2010 | Dariush et al. |
| 2012/0092445 | A1 * | 4/2012 | McDowell et al. ........ 348/14.16 |
| 2012/0154373 | A1 | 6/2012 | Finocchio et al. |
| 2012/0163723 | A1 | 6/2012 | Balan et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Li, et al., "Real time Hand Gesture Recognition using a Range Camera", Retrieved at << http://www.araa.asn.au/acra/acra2009/papers/pap128s1.pdf >>, Australasian Conference on Robotics and Automation (ACRA), Dec. 2-4, 2009, pp. 7.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Non-rigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Plagemann, et al., "Real-time Identification and Localization of Body Parts from Depth Images", Retrieved at <<http://ieeexplore.ieee.org/stamp/stamp.jsp?tp=arnumber=5509559 >>, IEEE International Conference on Robotics and Automation (ICRA), May 3-7, 2010, 6 Pages.

Cohen, I. et al., "Inference of Human Postures by Classification of 3d Human Body Shape", IEEE Workshop on Analysis and Modeling of Faces and Gestures, Mar. 2003, 8 pages.

Jungling, et al.,"Feature Based Person Detection Beyond the Visible Spectrum", IEEE Computer Society Conference on Computer Vision and Pattern Recognition Workshops, Jun. 20-25, 2009, pp. 30-37.

Khan, et al., "Real-time Human Motion Detection and Classification", IEEE Proceedings Students Conference, Aug. 16-17, 2002, pp. 135-139.

"Human motion-capture for Xbox Kinect", Retrieved at << http://research.microsft.com/en-us/projects/vrkinect/ >>, Retrieved Date: Apr. 15, 2011, 3 Pages.

Bolan, A. et al., "Attribute State Classification," U.S. Appl. No. 13/098,899, fled May 2, 2011, 38 pages.

Finocchio, M. et al., "Parallel Processing Machine Learning Decision Tree Training", U.S. Appl. No. 12/969,112, filed Dec. 15, 2010, 33 pages.

\* cited by examiner

CLASSIFICATION OF POSTURE STATES

BACKGROUND

Controller-free interactive systems, such as gaming systems, may be controlled at least partially by natural movements. In some examples, such systems may employ a depth sensor, or other suitable sensor, to estimate motion of a user and translate the estimated motions into commands to a console of the system. However, in estimating the motions of a user, such systems may only estimate major joints of the user, e.g., via skeleton estimation, and may lack the ability to detect subtle gestures.

SUMMARY

Accordingly, various embodiments directed to estimating a posture of a body part of a user are disclosed herein. For example, in one disclosed embodiment, an image is received front a sensor, where the image includes at least a portion of at image of the user including the body part. The skeleton information of the user is estimated from the image, a region of the image corresponding to the body part is identified at least partially based on the skeleton information, and a shape descriptor is extracted for the region and the shape descriptor is classified based on training data to estimate the posture of the body part. A response then may be output based on the estimated posture of the body part.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
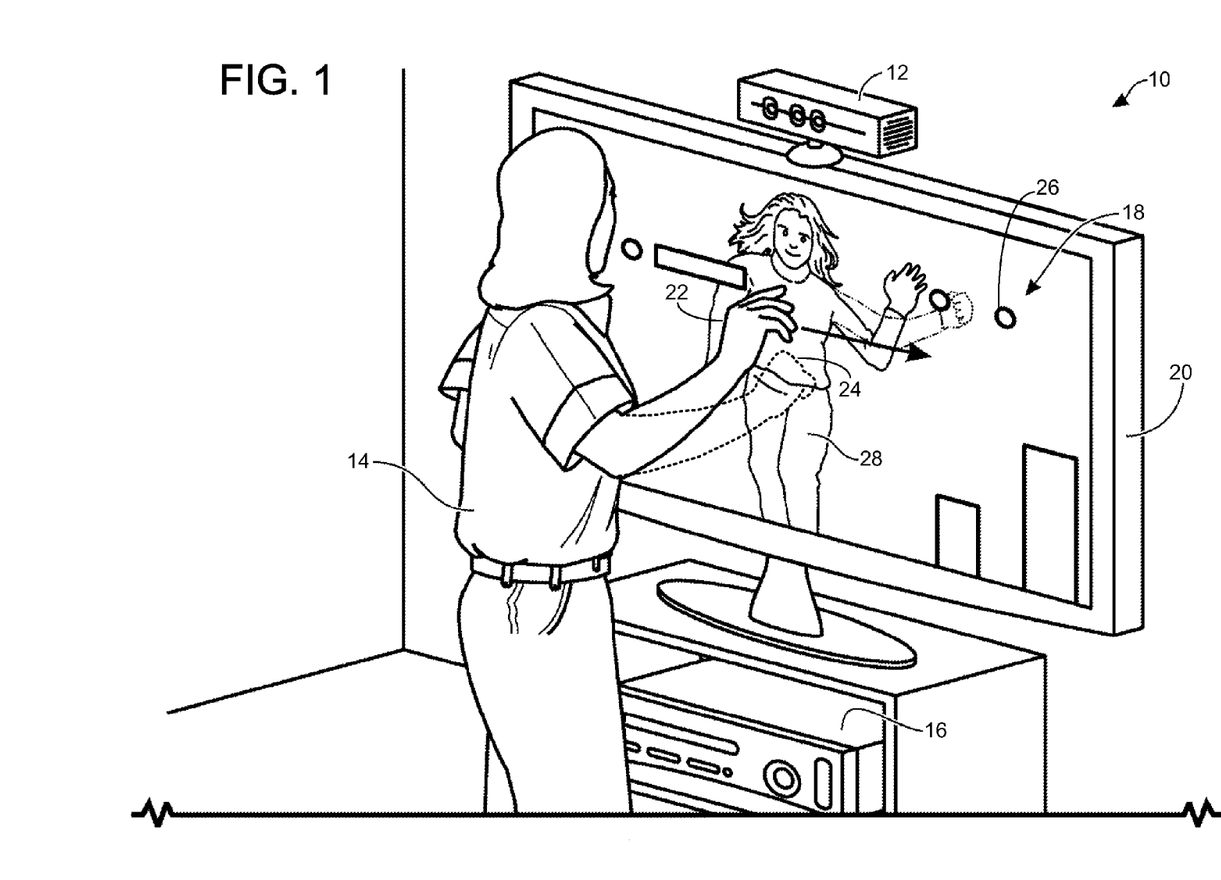
FIG. 1 shows an illustration of a user interacting with an embodiment of a controller-free gaming system using natural movements as captured by a depth camera.

Controller-free interactive systems, e.g., gaming systems, such as shown at 10 in FIG. 1, may employ a capture device 12, e.g., a depth camera or other suitable sensor, to estimate motions of a user 14. Motions of user 14 may be estimated in a variety of different ways. In one example approach, skeletal mapping may be employed to estimate one or more joint locations from the image of the user. The estimated motions of the user may be translated into commands to a console 16 of the system. In some examples, such commands may permit interaction of the user with games displayed at 18 on a display device 20. For example, an image 28 of user 14 may be displayed on display device 20 as the user interacts with objects, such as object 26, displayed on display device 20.

However, motion estimation routines such as skeleton mapping may lack the ability to detect subtle gestures of a user. For example, such motion estimation routines may lack the ability to detect and/or distinguish subtle hand gestures such as a user's open and closed hands, shown at 22 and 24 in FIG. 1, respectfully.

Accordingly, systems and methods, described below herein, are directed to determining a state of a hand of a user. For example, the action of closing and opening the hand may be used by such systems for triggering events such as selecting, engaging, or grabbing and dragging objects, e.g., object 26, on the screen, actions which otherwise would correspond to pressing a button when using a controller. Such refined controller-free interaction can be used as an alternative to approaches based on hand waving or hovering, which may be unintuitive or cumbersome. By determining states of a user's hand as described below herein, interactivity of a user with the system may be increased and simpler and more intuitive interfaces may be presented to a user.

Figure 2:
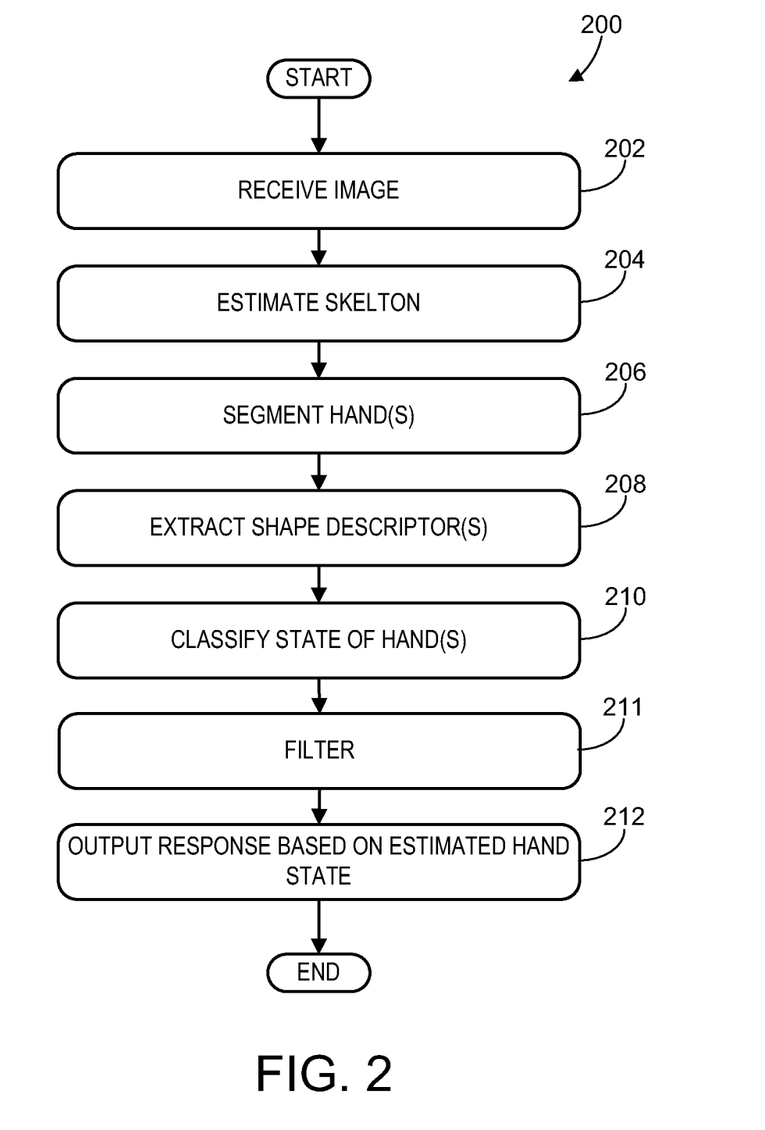
FIG. 2 shows an example method of determining a state of a hand of a user in accordance with an embodiment of the present disclosure.
Figure 3:
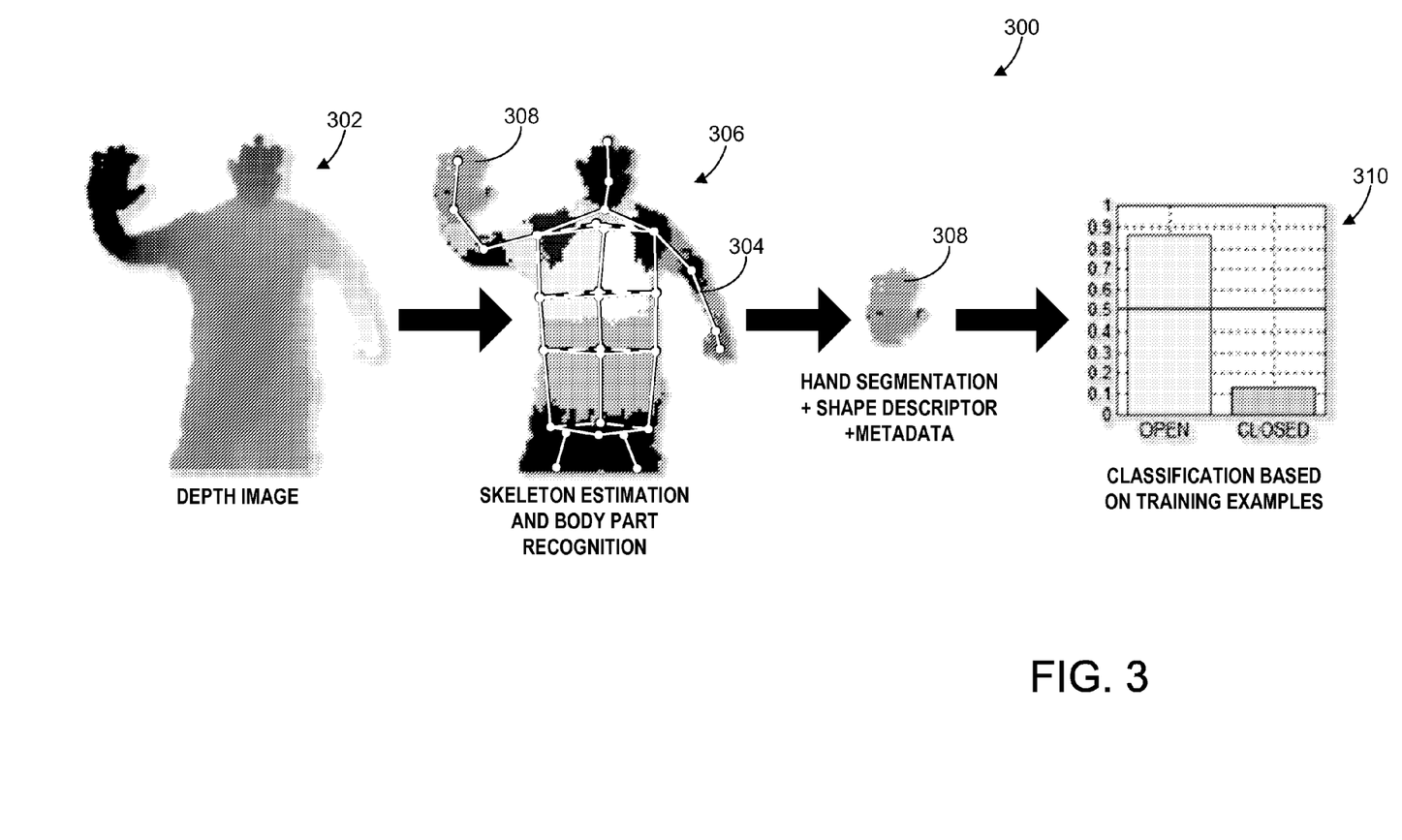
FIG. 3 illustrates an example method of determining a state of a hand of a user in accordance with an embodiment of the present disclosure.

FIG. 2 shows an example method 200 of determining a state of a hand of a user in accordance with an embodiment of present disclosure, and FIG. 3 illustrates various steps of a method, such as method 200, of determining a state of a hand of a user in accordance with an embodiment of present disclosure. Since FIG. 3 includes example illustrations of various processes of FIG. 2, FIG. 2 and FIG. 3 will be described concurrently in the following.

At 202, method 200 includes receiving a depth image from a capture device, e.g., capture device 12 shown in FIG. 1. The capture device may be any suitable device which captures three-dimensional image data, such as a depth camera. The depth image captured by the capture device includes at least a portion of an image of the user including the hand. For example, as shown in FIG. 1, a user 14 may be interacting with a computing system 10 which captures images of the user via capture device 12.

A depth image of a portion of a user is illustrated in FIG. 3 at 302. Each pixel in the depth image includes depth information, e.g., as illustrated in FIG. 3 by a gray-scale gradient For example, at 302, the left hand of the user is closer to the capture device, as indicated by the darker region of the hand, than the right hand. The capture device or depth camera captures images of a user within an observed scene. As described below, a depth image of a user may be used to determine distance information of regions of the user, scale information of the user, curvature, and skeletal information of the user.

At 204, method 200 includes estimating skeleton information of the user to obtain a virtual skeleton from a depth image obtained in step 202. For example, in FIG. 3, a virtual skeleton 304 is shown as estimated from the depth image shown at 302 of the user. Virtual skeleton 304 may be derived from depth image at 302 to provide a machine readable representation of a user, e.g., user 14. The virtual skeleton 304 may be derived from the depth image in any suitable manner. In some embodiments, one or more skeletal fitting algorithms may be applied to the depth image. It will be understood that any suitable skeletal modeling technique may be used.

The virtual skeleton 304 may include a plurality of joints, each joint corresponding to a portion of the user. The illustration in FIG. 3 is simplified for clarity of understanding. Virtual skeletons in accordance with the present disclosure may include any suitable number of joints, each of which can be associated with virtually any number of parameters (e.g., three dimensional joint position, joint rotation, body posture of a corresponding body part, etc.) It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As remarked above, current motion estimation from depth images, such as skeleton estimating described above, may lack the ability to detect subtle gestures of a user. For example, such motion estimation routines may lack the ability to detect and/or distinguish subtle hand gestures such as a user's open and closed hands, shown at 22 and 24 in FIG. 1, respectfully. Additionally, the limited resolution of the depth images at increasing depths, coupled with variations in hand sizes between users of different ages and/or body shape, and variations of the hands relative orientation with respect to the capture device may increase difficulty in detecting and classifying refined gestures, such as open and closed hands.

However, such an estimated skeleton may be used to estimate a variety of other physical attributes of the user. For example, the skeleton data may be used to estimate user body and/or body part size, orientation of one or more user body parts with respect to each other and/or the capture device, depth of one or more user body parts relative to the capture device, etc. Such estimations of physical attributes of a user then may be employed to normalize and reduce variability in detecting and classifying states of a user's hands, as described below.

At 206, method 200 includes segmenting a hand or hands of the user. In some examples, method 200 may additionally include segmenting one or more regions of the body in addition to the hands.

Segmenting a hand of a user includes identifying a region of the depth image corresponding to the hand, where the identifying is at least partially based on the skeleton information obtained in step 204. Likewise, any region of the body of a user may be identified in a similar manner as described below. At 306, FIG. 3 illustrates an example of segmentation of the depth image of a user into different regions based on estimated skeleton 304, as indicated by the differently shaded regions. In particular, FIG. 3 shows localized hand region 308 corresponding to the user's raised right hand.

Hands or body regions may be segmented or localized in a variety of ways and may be based on selected joints identified in the skeleton estimation described above.

As one example, hand detection and localization in the depth image may be based on the estimated wrist and/or hand tip joints from the estimated skeleton. For example, in some embodiments, hand segmentation in the depth image may be performed using a topographical search of the depth image around the hand joints, locating nearby local extrema in the depth image as candidates for finger tips, and segmenting the rest of the hand by taking into account a body size scaling factor as determined from the estimated skeleton, as well as depth discontinuities for boundary identification.

As another example, a flood-fill approach may be employed to identify regions of the depth image corresponding to a user's hands. In a flood-fill approach, the depth image may be searched from a starting point and a starting direction, e.g., the starting point may be the wrist joint and the starting direction may be a direction from the elbow to the wrist joint. Nearby pixels in the depth image may be iteratively scored based on the projection on the starting direction as a way for giving preference to points moving away from the elbow and towards the hand tip, while depth consistency constraints such as depth discontinuities may be used to identify boundaries or extreme values of a user's hands in the depth image. In some examples, threshold distance values may be used to limit the depth map search in both the positive and negative directions of the starting direction based on fixed values or scaled based on an estimated size of the user, for example.

As still another example, a bounding sphere or other suitable bounding shape, positioned based on skeleton joints (e.g. wrist or hand tip joints), may be used to include all pixels in the depth image up to a depth discontinuity. For example, a window may be slid over the bounding sphere to identify depth discontinuities which may be used to establish a boundary in the hand region of the depth image.

In some approaches, segmenting of hand regions may be performed when a user raises the hands outward or above the torso. In this way, identification of hand regions in the depth image may be less ambiguous since the hand regions may be distinguished from the body more easily.

It should be understood that the example hand segmentation examples described above are presented for the purpose of example and are not intended to limit the scope of this disclosure. In general, any hand or body part segmentation method may be used alone or in combination with each other and/or one of she example methods described above.

Continuing with method 200 in FIG. 2, at 208, method 200 includes extracting a shape descriptor for the region, e.g., the region of e depth image corresponding to a hand as identified in step 206. The shape descriptor extracted in step 208 may be any suitable representation of the hand region which is used to classify the hand region, for example, based on training data as described below. In some embodiments, the shape descriptor may be a vector or a set of numbers used to codify or describe the shape of the hand region.

In some examples, the shape descriptor may be invariant to one or more transformations, such as congruency (translation, rotation, reflection, etc.), isometry, depth changes, etc. For example, the shape descriptor may be extracted in such a way as to be invariant to an orientation and location of the hand with respect to the capture device or sensor. A shape descriptor can also be made invariant to reflection, in which case it does not distinguish between the left and right hand. Further, if a shape descriptor is not invariant to reflection, it can always be mirrored by flipping the input image left-right, thereby doubling the amount of training data for each hand. Further, the shape descriptor may be normalized based on an estimated body size so as to be substantially invariant to body and or hand size differences between different users. Alternatively, a calibration step may be performed in advance where the scale of the person is pre-estimated, in which case the descriptor need not be size invariant.

As one example of shape descriptor extraction, a histogram of distances in the hand region identified in step 206 from the centroid of the hand region may be constructed. For example, such a histogram may include fifteen bins, where each bin includes the number of points in the hand region whose distance to the centroid is within a certain distance range associated with that bin. For example, the first bin in such a histogram may include the number of points in the hand region whose distance to the centroid is between 0 and 0.40 centimeters, the second bin includes the number of points in the hand region whose distance to the centroid is between 0.4 and 0.80 centimeters, and so forth. In this way, a vector may be constructed to codify the shape of the hand. Such vectors may further be normalized based on estimated body size, for example.

In another example approach, a histogram may be constructed based on distances and/or angles from points in the hand region to a joint, bone segment or palm plane from the user's estimated skeleton, e.g., the elbow joint, wrist joint, etc.

Another example of a shape descriptor is a Fourier descriptor. Construction of a Fourier descriptor may include codifying a contour of the hand region, e.g., via mapping a distance from each pixel in the hand region to a perimeter of the hand region against a radius of an elliptical fitting of the boundary of the hand and then performing a Fourier transform on the map. Further, such descriptors may be normalized, e.g., relative to an estimated body size. Such descriptors may be invariant to translation, scale, and rotation.

Still another example of constructing a shape descriptor includes determining a convexity of the hand region, e.g., by determining a ratio of an area of a contour of the hand region to the convex hull of the hand region.

It should be understood that the example shape descriptors described above are exemplary in nature and are not intended to limit the scope of this disclosure. In general, any suitable shape descriptor for a hand region may be used alone or in combination with each other and/or one of the example methods described above. For example, shape descriptors, such as the histograms or vectors described above, may be mixed and matched, combined, and/or concatenated into larger vectors, etc. This may allow the identification of new patterns that were not identifiable by looking at them in isolation.

Continuing with method 200, at 210, method 200 includes classifying the state of the hands. For example, the shape descriptor extracted at step 208 may be classified based on training data to estimate the state of the hand. For example, as illustrated at 310 in FIG. 3 hands may be classified as open or closed. In some examples, training data may comprise labeled depth image examples of various hand states. Training data may be real or synthetically generated, depicting full or upper-body 3D models with different body sizes and arm orientations, as well as different articulated hand poses based on motion capture or hand-designed hand poses. Synthetic images can be degraded to simulate noisy real images.

In some examples, the training data used in the classification step 210, may be based on a pre-determined set of hand examples. The hand examples may be grouped or labeled based on a representative hand state against which the shape descriptor for the hand region is compared.

In some examples, various eta-data may be used to partition the training data. For example, the training data may include a plurality of hand state examples which may be partitioned based on one or more of hand side (e.g., left or right), hand orientation (e.g., lower arm angle or lower arm orientation), depth, and/or a body size of the user, for example. Partitioning of these training hand examples into separate subsets may reduce variability in hand shape within each partition which may lead to more accurate overall classification of hand state.

Additionally, in some examples, the training data may be specific to a particular application. That is, the training data may depend on expected actions in a given application, e.g., an expected activity in a game, etc. Further, in some examples, the training data may be user specific. For example, an application or game may include a training module wherein a user performs one or more training exercises to calibrate the training data. For example, a user may perform a sequence of open and closed hand postures to establish a training data set used in estimating user hand states during a subsequent interaction with the system.

Classification of a user's hand may be performed based on training examples in a variety of ways. For example, various machine learning techniques may be employed in the classification. Non-limiting examples include: support vector machine training, regression, nearest neighbor, (un)supervised clustering, etc.

As remarked above, such classification techniques may use labeled depth image examples of various hand states for predicting the likelihood of an observed hand as being in one of several states. Additionally, confidences may be added to a classification either during or following the classification step. For example, confidence intervals may be assigned to an estimated hand state based on the training data or by fitting a sigmoid function, or other suitable error function, to the output of the classification step.

As a simple, non-limiting example of classifying a hand state, there may be two possible hand states, open or closed, such as shown at 310 in FIG. 3. In this example, the training data may include two labeled hand sets: a first set of hand examples representing hand states that are open or approximately open and a second set of hand examples representing hand states that are closed or approximately closed. In this way, when given an extracted shape descriptor for an identified hand region, the extracted shape descriptor of the identified hand region may be compared to hand examples of the first (open) and second (closed) hand sets to determine a likelihood that the identified hand region falls in each set. The state of the hand may then be estimated based on the higher likelihood.

For example, as shown in FIG. 3 at 310, the identified hand region is determined to have a higher likelihood of being open, thus is classified as such. Additionally, in some examples, the determined likelihoods of the identified hand being in a particular hand state may be used to establish confidence intervals to the estimation of the hand state.

Various post-classification filtering steps may be employed to increase accuracy of the hand state estimations. Thus, at 211, method 200 may include a filtering step. For example, a temporal-consistency filtering, e.g., a low-pass filter, step may be applied to predicted hand states between consecutive depth image frames to smooth the predictions and reduce temporal uttering, e.g., due to spurious hand movements, sensor noise, or occasional classification errors. That is, a plurality of states of a user's hand based on a plurality of depth images from the capture device or sensor may be estimated and temporal filtering of the plurality of estimates to estimate the state of the hand may be performed. Further, in some examples, classification results may be biased toward one state or another (e.g., towards open or closed hands), as some applications may be more sensitive to false positives (in one direction or another) than other applications.

Continuing with method 200, at 212 method 200 includes outputting a response based on the estimated hand state. For example, a command may be output to a console of a computing system, such as console 16 of computing system 10. As another example, a response may be output to a display device, such as display device 20. In this way, estimated motions of the user, including estimated hand states may be translated into commands to a console 16 of the system 10, so that the user may interact with the system as described above. Further, the method and processes described above may be implemented to determine estimates of states of any part of a user's body, e.g., mouth, eyes, etc. For example, a posture of a body part of a user may be estimated using the methods described above.

Figure 4:
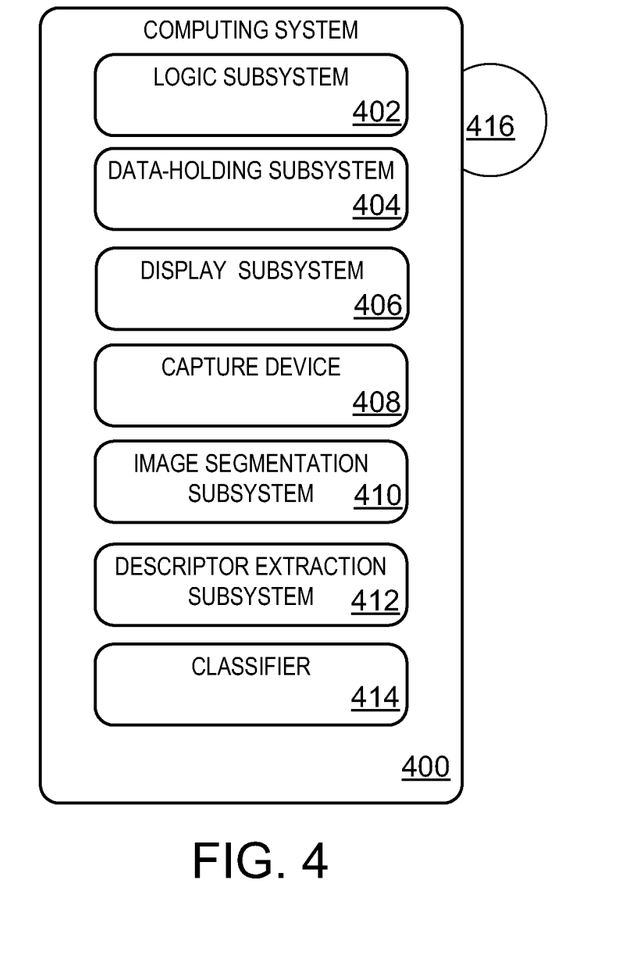
FIG. 4 schematically shows a computing system in accordance with an embodiment of the present disclosure.

The methods and processes described herein may be tied to a variety of different types of computing systems. The computing system 10 described above is a nonlimiting example system which includes a gaming console 16, display device 20, and capture device 12. As another, more general, example, FIG. 4 schematically shows a computing system 400 that may perform one or more of the methods and processes described herein. Computing system 400 may take a variety of different forms, including, but not limited to, gaming consoles, personal computing systems, and audio/visual theaters, among others.

Computing system 400 may include a logic subsystem 402, a data-holding subsystem 404 operatively connected to the logic subsystem, a display subsystem 406, and/or a capture device 408. The computing system may optionally include components not shown in FIG. 4, and/or some components shown in FIG. 4 may be peripheral components that are not integrated into the computing system. Further, computing system 400 may be part of a network, for example a local or wide area network.

Logic subsystem 402 may include one or more physical devices configured to execute one or more instructions. For example, logic subsystem 402 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. Logic subsystem 402 may include one or more processors that are configured to execute software instructions. Additionally or alternatively, logic subsystem 402 may include one or more hardware or firmware logic machines configured to execute hardware or firmware instructions. Logic subsystem 402 may optionally include individual components that are distributed throughout two or more devices, which may be remotely located in some embodiments.

Data-holding subsystem 404 may include one or more physical devices configured to hold data and/or instructions executable by the logic subsystem to implement the herein described methods and processes. When such methods and processes are implemented, the state of data-holding subsystem 404 may be transformed (e.g., to hold different data). Data-holding subsystem 404 may include removable media and/or built-in devices. Data-holding subsystem 704 may include optical storage devices, semiconductor memory and storage devices (e.g., RAM, EEPROM, flash, etc.), and/or magnetic storage devices, among others. Data-holding subsystem 404 may include devices with one or more of the following characteristics: volatile, nonvolatile, dynamic, static, read/write, read-only, random access, sequential access, location addressable, file addressable, and content addressable. In some embodiments, logic subsystem 402 and data-holding subsystem 404 may be integrated into one or more common devices, such as an application specific integrated circuit or a system on a chip.

FIG. 4 also shows an aspect of the data-holding subsystem in the form of computer-readable removable storage media 416, e.g., a DVD, CD, floppy disk, and/or tape drive, which may be used to store and/or transfer data and/or instructions executable to implement the herein described methods and processes.

Display subsystem 406 may be used to present a visual representation of data held by data-holding subsystem 404. As the herein described methods and processes change the data held by the data-holding subsystem, and thus transform the state of the data-holding subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or data-holding subsystem 404 in a shared enclosure, or such display devices may be peripheral display devices.

Computing system 400 further includes a capture device 408 configured to obtain depth images of one or more targets and/or scenes. Capture device 408 may be configured to capture video with depth information via any suitable technique (e.g., time-of-flight, structured light, stereo image, etc.). As such, capture device 408 may include a depth camera, a video camera, stereo cameras, and/or other suitable capture devices.

For example, in time-of-flight analysis, the capture device 408 may emit infrared light to the scene and may then use sensors to detect the backscattered light from the surfaces of the scene. In some cases, pulsed infrared light may be used, wherein the time between an outgoing light pulse and a corresponding incoming light pulse may be measured and used to determine a physical distance from the capture device to a particular location on the scene. In some cases, the phase of the outgoing light wave may be compared to the phase of the incoming light wave to determine a phase shift, and the phase shift may be used to determine a physical distance from the capture device to a particular location in the scene.

In another example, time-of-flight analysis may be used to indirectly determine a physical distance from the capture device to a particular location in the scene by analyzing the intensity of the reflected beam of light over time via a technique such as shuttered light pulse imaging.

In another example, structured light analysis may be utilized by capture device 408 to capture depth information. In such an analysis, patterned light (e.g., light displayed as a known pattern such as a grid pattern or a stripe pattern) may be projected onto the scene. On the surfaces of the scene, the pattern may become deformed, and this deformation of the pattern may be studied to determine a physical distance from the capture device to a particular location in the scene.

In another example, the capture device may include two or more physically separated cameras that view a scene from different angles, to obtain visual stereo data. In such cases, the visual stereo data may be resolved to generate a depth image.

In other embodiments, capture device 408 may utilize other technologies to measure and/or calculate depth values.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of scene analysis, image capture, face recognition, high-precision tracking of fingers or other small features), light sensing, and/or other functions. In some embodiments, two or more depth and/or RGB cameras may be placed on different sides of the subject to obtain a more complete 3D model of the subject or to further refine the resolution of the observations around the hands. In other embodiments, a single camera may be used, e.g., to obtain an RGB image, and the image may be segmented based on color, e.g., based on a color of a hand.

It is to be understood that at least some depth analysis operations may be executed by a logic machine of one or more capture devices. A capture device may include one or more onboard processing units configured to perform one or more depth analysis functions. A capture device may include firmware to facilitate updating such onboard processing logic.

Computing system 400 may further include various subsystems configured to execute one or more instructions that are part of one or more programs, routines, objects, components, data structures, or other logical constructs. Such subsystems may be operatively connected to logic subsystem 402 and/or data-holding subsystem 404. In some examples, such subsystems may be implemented as software stored on a removable or non-removable computer-readable storage medium.

For example, computing system 400 may include an image segmentation subsystem 410 configured to identify a region of the depth image corresponding to the hand, the identifying being at least partially based on the skeleton information. Computing system 400 may additionally include a descriptor extraction subsystem 412 configured to extract a shape descriptor for a region identified by image segmentation subsystem 410. Computing system 400 may further include a classifier subsystem 414 configured to classify the shape descriptor based on training data to estimate the state of the hand.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

Additionally, it should be understood that the examples of open and closed hand detection described here are exemplary in nature and are not intended to limit the scope of this disclosure. The methods and systems described herein may be applied to estimating a variety of refined gestures in a depth image. For example, various other hand profiles may be estimated using the systems and methods described herein. Non-limiting examples include: fist postures, open palm postures, pointing fingers, etc.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for estimating a posture of a body part of a user, comprising:
   receiving an image from a sensor, the image including at least a portion of an image of the user including the body part;
   estimating skeleton information of the user to obtain a virtual skeleton from the image, the virtual skeleton including a plurality of joints;
   identifying a region of the image corresponding to the body part, the identifying being at least partially based on the skeleton information;
   extracting a shape descriptor for the region;
   classifying the shape descriptor based on training data to estimate the posture of the body part; and
   outputting a response based on the estimated posture of the body part.

2. The method of claim 1, further comprising estimating a body size scaling factor based on at least one distance between joints in the skeleton information and normalizing the shape descriptor based on the body size scaling factor.

3. The method of claim 2, wherein identifying a region of the image corresponding to the body part includes using a topographical search based on the body size scaling factor.

4. The method of claim 1, wherein identifying a region of the image corresponding to the body part is at least partially based on a flood fill approach.

5. The method of claim 1, wherein the body part is a hand and estimating the posture of the body part includes estimating whether the hand is open or closed.

6. The method of claim 1, further comprising estimating a plurality of postures of the body part based on a plurality of images from the sensor and performing temporal filtering of the plurality of estimates to estimate an estimated posture of the body part.

7. The method of claim 1, further comprising assigning a confidence interval to the estimated posture of the body part.

8. The method of claim 1, wherein classifying the shape descriptor based on training data to estimate the posture of the body part is based on at least one machine learning technique.

9. The method of claim 1, wherein the body part is a hand and the training data is partitioned based on meta-data, the meta-data including at least one of a hand orientation, a lower arm angle, a lower arm orientation, depth, and a body size of the user.

10. The method of claim 1, wherein the method further comprises, normalizing the shape descriptor to correct for variations in orientation and location of the body part with respect to the sensor and body size between different users.

11. A computer-readable memory including instructions stored thereon that are executable by a computing device to:
   receive a depth image from a depth camera, the depth image including at least a portion of an image of a user including a hand;
   estimate skeleton information of the user to obtain a virtual skeleton from the depth image, the virtual skeleton including a plurality of joints;
   identify a region of the depth image corresponding to the hand, the identifying being at least partially based on the skeleton information;
   extract a shape descriptor for the region;
   classify the shape descriptor based on training data to estimate the state of the hand, wherein the training data is partitioned based on meta-data, the meta-data including at least one of hand orientation, depth and a body size of the user; and
   output a response based on the estimated state of the hand.

12. The computer-readable memory of claim 11 further including instructions executable to:
   estimate a body size scaling factor based on at least one distance between joints in the skeleton information,
   normalize the shape descriptor based on the body size scaling factor, and
   normalize the shape descriptor to correct for variations in orientation and location of the hand with respect to the sensor, and variations in body size between different users.

13. The computer-readable memory of claim 12, wherein identifying a region of the depth image corresponding to the hand includes using a topographical search based on the body size scaling factor.

14. The computer-readable memory of claim 11, wherein identifying a region of the depth image corresponding to the hand is at least partially based on a flood fill approach.

15. The computer-readable memory of claim 11, wherein estimating the state of the hand includes estimating whether the hand is open or closed.

16. The computer-readable memory of claim 11 further including instructions executable to: estimate a plurality of states of the hand based on a plurality of depth images from the sensor and performing temporal filtering of the plurality of estimates to estimate the state of the hand.

17. The computer-readable memory of claim 11 further including instructions executable to: assign a confidence interval to the estimated state of the hand.

18. A computing system, comprising:
- a depth camera configured to capture depth information useable to construct a depth image;
- a logic subsystem operatively connected to the depth camera; and
- a data-holding subsystem holding instructions executable by the logic subsystem to:
  - receive a depth image from the depth camera, the depth image including at least a portion of an image of a user including a hand of the user;
  - estimate skeleton information of the user to obtain a virtual skeleton from the depth image, the virtual skeleton including a plurality of joints;
  - identify a region of the depth image corresponding to the hand, the identifying being at least partially based on the skeleton information;
  - extract a shape descriptor for the region;
  - classify the shape descriptor based on training data to estimate the state of the hand; and
  - output a response based on the estimated state of the hand.

19. The system of claim 18, wherein the data-holding subsystem holding instructions is further executable by the logic subsystem to: partition the training data based on meta-data, the meta-data including at least one of hand orientation, depth and a body size of the user.

20. The system of claim 18, wherein the data-holding subsystem holding instructions is further executable by the logic subsystem to: estimate a plurality of states of the hand based on a plurality of depth images from the sensor and perform temporal filtering of the plurality of estimates to estimate an estimated state of the hand.

* * * * *